Jan. 24, 1928.
C. T. EVANS
1,657,303
PHASE FAILURE AND PHASE REVERSE PROTECTIVE DEVICE FOR
POLYPHASE ALTERNATING CURRENT CIRCUITS
Filed Jan. 3, 1921
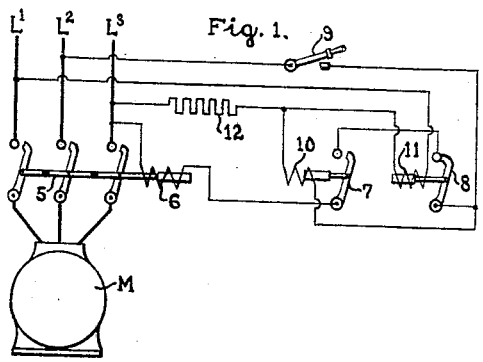
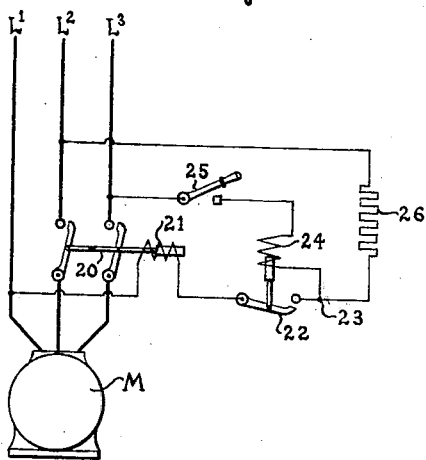
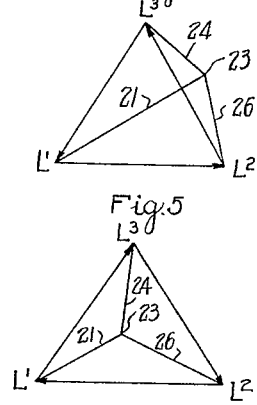
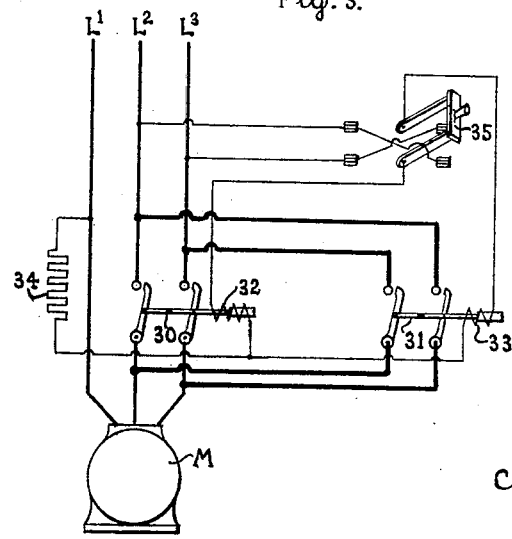
Inventor
Clarence T. Evans
By
Attorney Patented Jan. 24, 1928.

1,657,303

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

PHASE-FAILURE AND PHASE-REVERSE PROTECTIVE DEVICE FOR POLYPHASE ALTERNATING-CURRENT CIRCUITS.

Application filed January 3, 1921. Serial No. 434,491.

This invention relates to phase failure and phase reverse protective devices for polyphase A. C. circuits.

It is known that an electromagnetically operated contactor having its operating winding connected in a three wire polyphase circuit in star with a suitably proportioned impedance and with a suitable non-inductive resistance may be calibrated to close and re10 main closed upon establishment and during maintenance of a given phase relation of the circuit and to be unresponsive for a different phase relation or upon failure of a given phase.

The present invention has among its objects that of providing an improved and simplified protective device embodying the foregoing principle.

Other objects and advantages will here20 inafter appear.

The accompanying drawing illustrates diagrammatically certain of the forms which the invention may assume in practice and the same will now be described, it being un25 derstood that the invention is capable of embodiment in numerous other forms falling within the scope of the appended claims.

In the drawing,

Figures 1 and 2 are diagrams illustrating slightly different forms of protective device embodying the invention;

Fig. 3 illustrates diagrammatically an adaptation of the invention to automatic maintenance of a given phase relation;

Figs. 4 and 5 are vector diagrams of the voltages under conditions of correct and reverse phase relations respectively.

Without entering upon an extended discussion of the theory underlying the opera40 tion of the aforementioned single contactor, for which no novelty is claimed herein, it may be stated that a switch having an operating coil connected in circuit as described, is subjected to different degrees of energiza45 tion corresponding to different conditions of phase rotation of the circuit and also dependent upon the energization of two lines of the supply circuit. Thus such switch may be calibrated to respond only under that con50 dition of phase rotation which corresponds to the higher degree of energization of its winding and when so calibrated will remain unresponsive under a different condition of phase rotation or following reduction of energization of either of said two supply lines below a given value.

Also it has been demonstrated that the aforementioned impedance may assume the form of an energizing coil for a second switch and may be so connected and calibrated as to render such switch unresponsive upon a given reduction of the energization of a different line of the supply circuit, but under other conditions to be responsive irrespective of the state of phase rotation.

Thus, as shown in Figs. 1 and 2, two electro-responsive switches having their operating windings connected to individual lines of a three wire polyphase circuit in star relation with a resistance the inductance of which is materially lower than that of either of said coils, are arranged to control jointly, either directly or indirectly, the continuity of at least two lines of such circuit, the arrangement being such that both of said switches are adapted to respond and remain closed under given conditions of phase rotation and line voltage, whereas one or the other of said switches is adapted to remain unresponsive upon reversal of such given phase rotation or upon reduction of the energization of any line of the supply circuit below a given value.

Referring more specifically to Fig. 1, the same shows lines L¹, L², L³ of a three wire circuit adapted to supply a motor M or other translating device and provided with an electromagnetic main switch 5, the latter having an actuating coil 6 and being shown as tri-polar although obviously a two pole switch might be employed. Said coil is provided with an energizing circuit connected across any two of said supply lines, continuity of such circuit being controllable jointly by a pair of electro-responsive switches 7 and 8 while a knife switch 9 is arranged in said circuit to provide for manual or remote control of said main switch.

Said switches 7 and 8 are respectively provided with actuating coils 10 and 11 each of which is connected at one end to a different supply line, the opposite ends of said coils being interconnected with one another and with the third supply line through a resistance 12 of relatively lower inductance thereby establishing a star connection. The knife switch 9 is further arranged to control continuity of circuit of coil 10.

With the circuit arrangement illustrated, it is to be assumed that switch 7 is calibrated to respond only when the phase rotation is such as to effect the higher degree of energization of its coil and while under conditions of energization of lines $L^2$ and $L^3$ above a given value. Switch 8, whose coil is continuously energized, is assumed to be so calibrated as to be responsive under a lesser degree of energization and hence to remain closed except upon reduction of the energization of line $L'$ below a given value.

Closure of knife switch 9 serves to complete the aforedescribed star connection and to thus effect energization of the closing coil 10 of switch 7, and assuming the proper phase rotation and sufficient energization of lines $L^2$ and $L^3$, said switch is adapted to close. Concurrent closure of switches 7, 8 and 9 completes the energizing circuit of the main switch which thereupon closes connecting the motor to its supply lines.

If at the time of closure of the knife switch 9 the phase rotation of the supply circuit is reversed or the energization of either of lines $L^2$ or $L^3$ has fallen below such given value, switch 7 does not close, whereas should the energization of line $L'$ have failed, switch 8 will be open and in either case the main switch remains unenergized.

Fig. 2 illustrates a similar circuit adapted to supply a motor M and provided with an electromagnetic main switch 20 arranged to control continuity of at least two lines of said circuit. Said main switch is provided with a closing coil 21 having one of its terminals line connected and its opposite terminal portion connected through an electro-responsive switch 22 with a star point indicated at 23. Said switch 22 is provided with an energizing coil 24 having one terminal portion connected with said star point and its opposite terminal connected to a second supply line through a knife switch 25, while a resistance 26 of relatively low inductance is likewise connected between said star point and the third line of said supply circuit.

Assuming calibration of main switch 20 to render the same responsive only under the aforedescribed conditions of higher energization of its coil and assuming calibration of switch 22 to be responsive except upon a given reduction of the energization of its associated supply lines, it is apparent that this construction affords a degree and character of protection similar to that provided by the construction of Fig. 1 while requiring a reduced number of relays and without necessitating energization of any electroresponsive switch until after closure of the knife switch.

Thus in the vector diagram of Fig. 4 the line 21 indicates the voltage applied to the winding of main switch 20 (Fig. 2) which voltage is of sufficient value to effect closure of said switch under conditions of correct phase relation; whereas under conditions of phase reversal as illustrated in Fig. 5 the value of voltage (21) applied to the winding of main switch 20 is insufficient to effect closure of the latter. The voltages applied to the winding 24 and resistance 26 (Fig. 2) are respectively indicated by lines 24 and 26 in Figs. 4 and 5.

In Fig. 3 the connection of the motor to two of its supply lines is controllable by means of a pair of double pole reverse switches 30 and 31 adapted to complete the connections for operation of the motor in opposite directions selectively and each being in general similar in construction to the main switch 20 of the preceding figure.

Said reverse switches are respectively provided with closing coils 32 and 33 to be connected to the supply circuit in star with one another and with a relatively low inductance resistance 34.

A double pole double throw knife switch 35 serves in one on position thereof to connect said coils individually with different lines of the supply circuit and in its opposite on position to interchange the connections of said coils with respect to said lines. Moreover, in this instance said switches are calibrated similarly and in a manner to render each responsive under a given condition of phase rotation and unresponsive upon reversal of the phase rotation, whereas with the aforedescribed circuit arrangement, for any given phase rotation said switches are respectively responsive and unresponsive and upon reversal of such phase rotation with respect to said switches, by means of knife switch 35 or otherwise, the switch which was formerly unresponsive is rendered responsive and vice versa.

Thus assuming a phase rotation of the supply circuit such that closure of switch 30 effects connections suitable for operation of the motor in the desired direction, knife switch 35 being operated to complete circuit through individual coils 32 and 33 in such relations as to render switch 30 responsive and switch 31 unresponsive, said former switch is adapted to close thus connecting the motor to its supply lines in the phase order suitable for operation of the motor in such desired direction. Under such conditions any phase reversal of the supply circuit serves to effect opening of that reverse switch which is closed and closure of the one which is open, thus affording automatic compensation for such change in phase rotation and causing the motor to continue to rotate in the desired direction.

Obviously voluntary reversal of the motor may be effected at any time by throwing the knife switch 35 to its opposite on position whereupon switches 30 and 31 are shifted and adapted to perform their aforedescribed automatic functions as before.

What I claim as new and desire to secure by Letters Patent is:

1. A protective device for polyphase A. C. circuits, comprising electro-magnetic switches each having a single phase magnetic circuit, a resistance of relatively low inductance, a star circuit connection for the coils of said switches and said resistance subjecting said switches to control in accordance with the condition of phase rotation of such circuit.

2. The combination with a polyphase A. C. circuit, of protective means therefor, comprising electro-magnetic switches each having a single phase magnetic circuit, a resistance of relatively low inductance, and connections between said polyphase circuit, the coils of said switches and said resistance placing said coils and said resistance in star relation to one another.

3. The combination with a polyphase A. C. circuit, of phase failure and phase reverse protective means therefor comprising electro-magnetic switches each having a single phase magnetic circuit, a resistance of relatively low inductance, and means to connect the coils of said switches and said resistance respectively to different lines of said polyphase circuit in star relation to one another for subjecting said switches to control in accordance with the conditions of line energization and phase rotation of said circuit.

4. The combination with a polyphase A. C. circuit and a translating device to be connected thereto, of electro-magnetic switches each having a single phase magnetic circuit and including a main switch and a switch to control the energizing circuit thereof, a resistance of relatively low inductance, and means to connect the coils of said switches and said resistance to said polyphase circuit in a star relation providing for closure of said switches but only under given conditions of phase rotation of said circuit.

5. The combination with a polyphase A. C. circuit and a translating device to be connected thereto, of switches having individual closing coils including a main switch and switches to control jointly the energizing circuit of said main switch, a resistance of relatively low inductance, and means to connect the closing coils of said latter switches and said resistance to said circuit in star relation providing for closure of said switches but only under given conditions of line energization and phase rotation of said circuit.

6. The combination with a polyphase A. C. circuit and a translating device to be connected thereto, of a pair of switches having single closing coils and including a main switch and a switch to control the energizing circuit of said main switch, a resistance of relatively low inductance, and means to connect the closing coils of said switches and said resistance to said circuit in star relation providing for closure of said switches but only under given conditions of line energization and phase rotation of said circuit.

7. The combination with a translating device and a polyphase supply circuit therefor, of electro-magnetic switches operable selectively to connect said device to said circuit and to commutate the phase relation thereof, and operating means for said switches comprising individual single phase magnetic circuits therefor, a resistance of relatively low inductance, and means to connect the coils of said switches and said resistance to said supply circuit in a relation providing for closure of said switches selectively under different conditions of phase rotation of said circuit.

8. The combination with a translating device and a polyphase supply circuit therefor, of electro-magnetic switches operable selectively to connect said device to said circuit and to commutate the phase relation thereof, and operating means for said switches comprising individual single phase magnetic circuits therefor, a resistance of relatively low inductance, and means to connect the coils of said switches and said resistance to said supply circuit in star relation to one another to provide for closure of said switches selectively under different conditions of phase rotation of said circuit.

In witness whereof, I have hereunto subscribed my name.

CLARENCE T. EVANS.